United States Patent [19]
Mitsui et al.

[11] Patent Number: 5,204,765
[45] Date of Patent: Apr. 20, 1993

[54] LIQUID CRYSTAL DISPLAY DEVICE HAVING REFLECTOR OF A SUBSTRATE, A PATTERNED RESIN, AND A REFLECTIVE FILM, AND METHOD OF MAKING SAME

[75] Inventors: Seiichi Mitsui; Naofumi Kimura; Yutaka Ishii, all of Nara, Japan

[73] Assignee: Sharp Kabushiku Kaisha, Osaka, Japan

[21] Appl. No.: 822,300

[22] Filed: Jan. 17, 1992

[30] Foreign Application Priority Data

Jan. 18, 1991 [JP] Japan .................................. 3-4573

[51] Int. Cl.⁵ .................................. G02F 1/1335
[52] U.S. Cl. .................................. 359/70; 359/900
[58] Field of Search .................. 359/70, 859, 871, 900

[56] References Cited

U.S. PATENT DOCUMENTS

| | | | |
|---|---|---|---|
| 4,106,859 | 8/1978 | Doriguzzi et al. | 359/70 |
| 4,431,272 | 2/1984 | Yazawa et al. | 350/336 |
| 4,456,336 | 6/1984 | Chung et al. | 359/70 |
| 4,519,678 | 5/1985 | Komatsubara et al. | 359/70 |
| 4,904,060 | 2/1990 | Grupp | 359/70 |
| 5,076,668 | 12/1991 | Dalisa et al. | 359/70 |
| 5,139,340 | 8/1992 | Okumura | 359/70 |

FOREIGN PATENT DOCUMENTS

| | | | |
|---|---|---|---|
| 0102687 | 5/1986 | Japan | 359/70 |
| 0128279 | 6/1986 | Japan | 359/70 |
| 2083525 | 3/1990 | Japan . | |
| 2244003 | 9/1990 | Japan . | |

OTHER PUBLICATIONS

Proceedings of the SID, T. Koizumi et al., vol. 29/2 (1988), pp. 157-160, "Reflective Multicolor LCD (II): Improvement in the Brightness".

New absorptive mode reflective liquid-crystal display device, D. L. White and G. N. Taylor, Jour. of Applied Physics, vol. 45, No. 11, 1974.

*Primary Examiner*—William L. Sikes
*Assistant Examiner*—Anita Pellman Gross
*Attorney, Agent, or Firm*—David G. Conlin; Donald R. Castle; George W. Neuner

[57] ABSTRACT

A reflective liquid crystal display device comprising a reflector with a number of small convex portions of the same shape is provided. The reflector is formed by patterning a photosensitive resin applied to one surface of a core substrate to a predetermined pattern so as to form a number of small convex portions, heat-treating the surface having the convex portions, and covering the surface with a reflective film. By suitably selecting the shape of the convex portions, the reflective properties of the reflector are controlled.

7 Claims, 11 Drawing Sheets

FIG. 5a
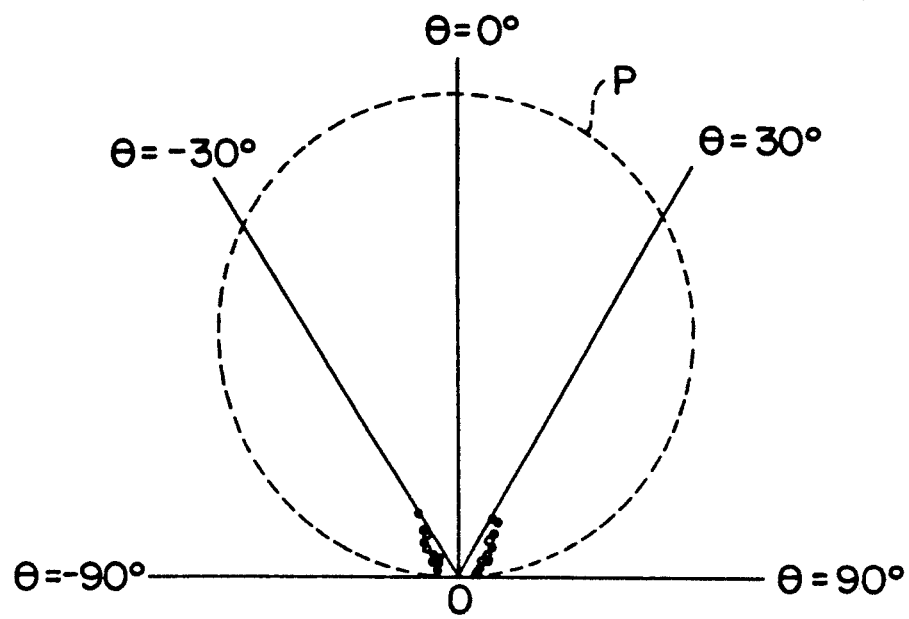
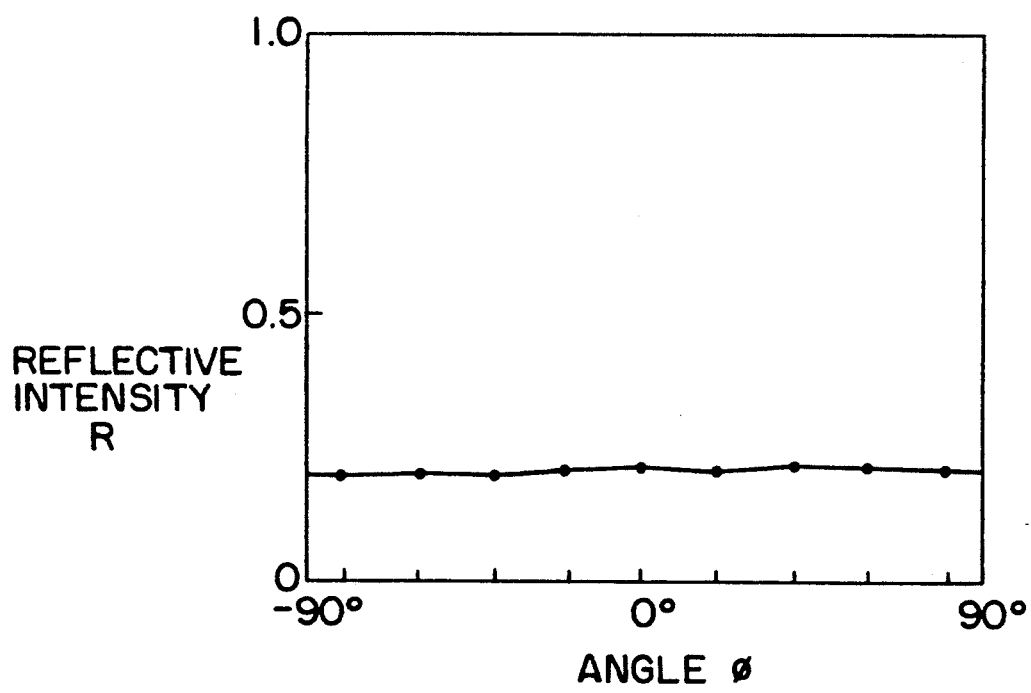
FIG. 5b

FIG. 6a
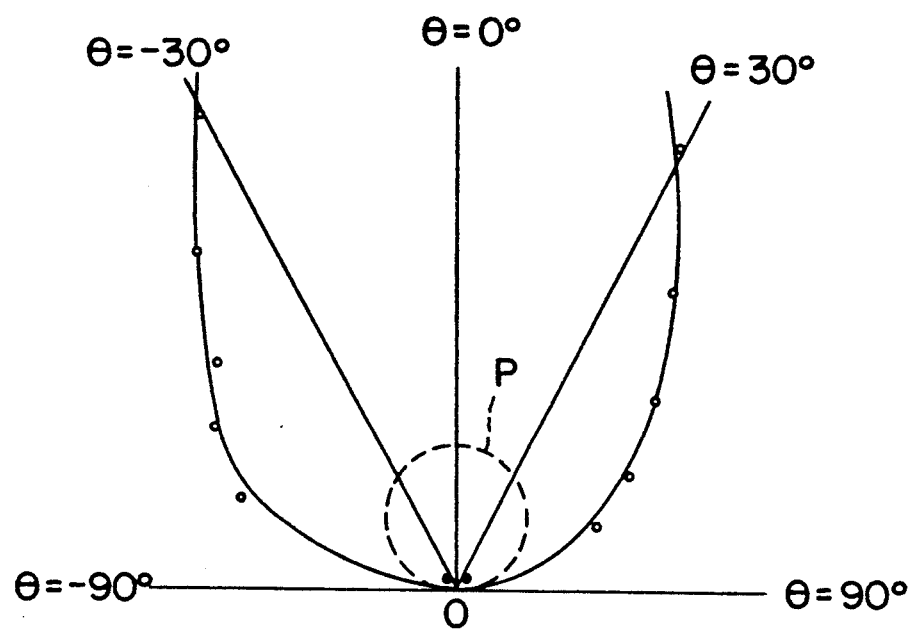
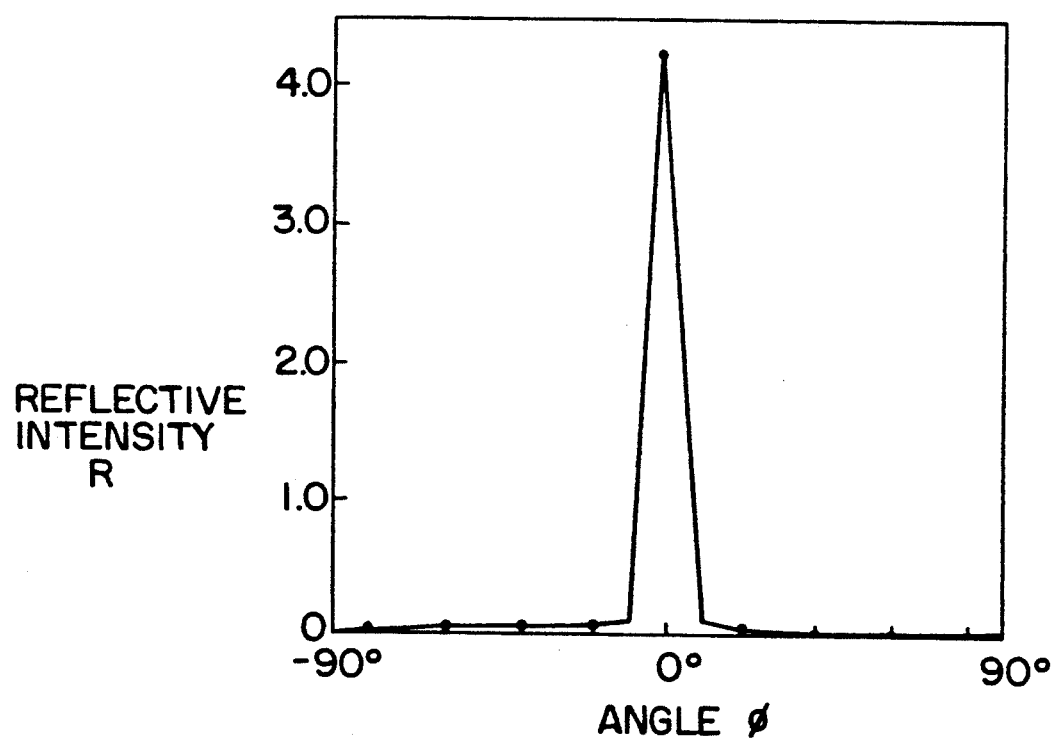
FIG. 6b

FIG. 9a
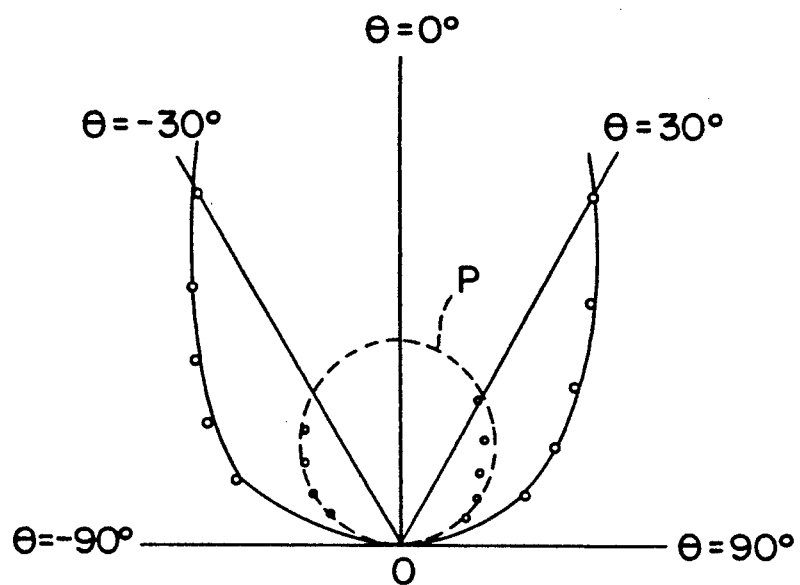
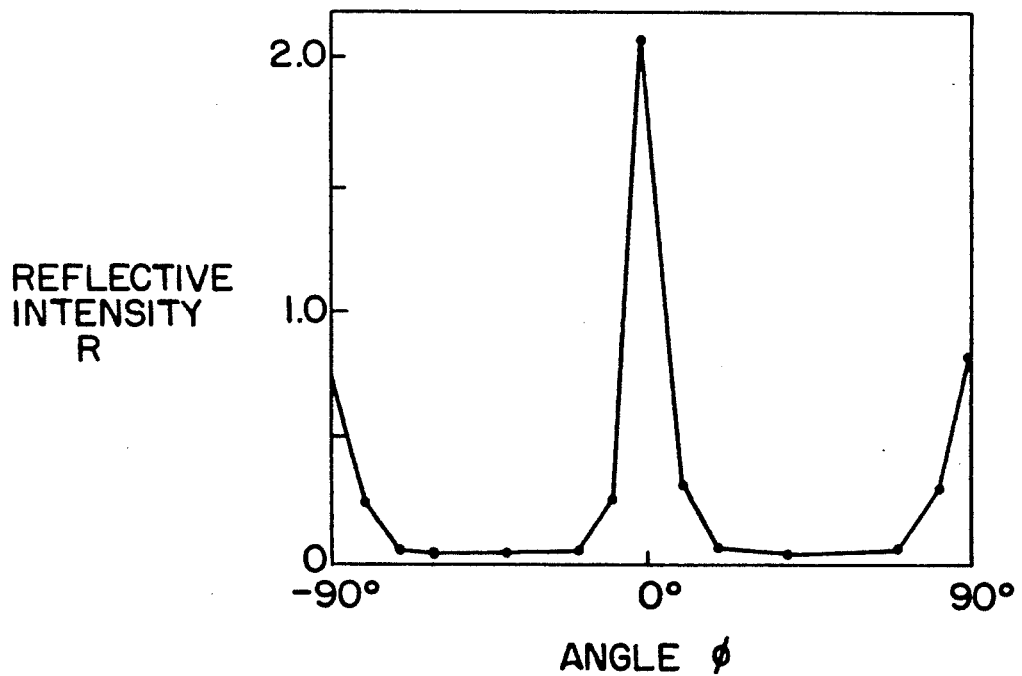
FIG. 9b

FIG.10a
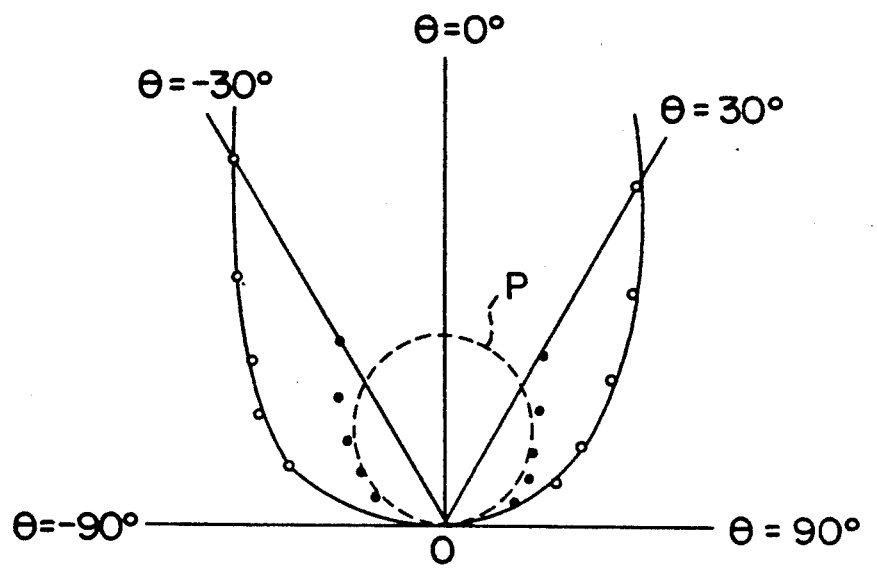
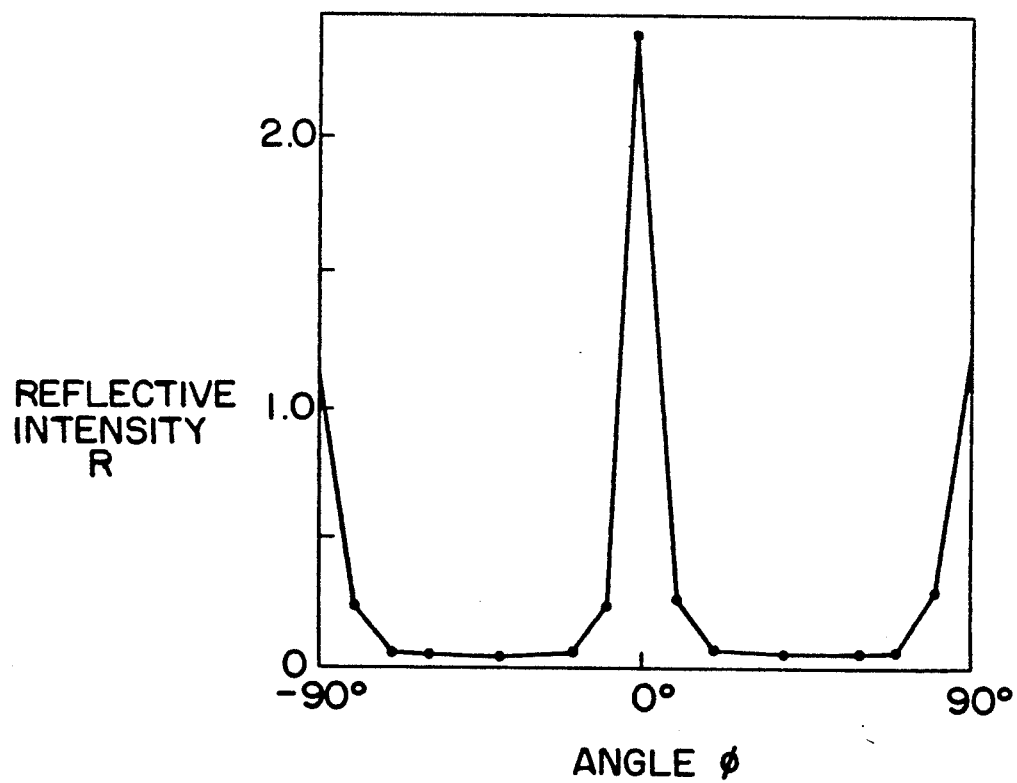
FIG.10b

LIQUID CRYSTAL DISPLAY DEVICE HAVING REFLECTOR OF A SUBSTRATE, A PATTERNED RESIN, AND A REFLECTIVE FILM, AND METHOD OF MAKING SAME

BACKGROUND OF THE INVENTION

1. Field of the Invention

The present invention relates to a reflective liquid crystal display device which does not need a backlight, and a method for manufacturing the same.

2. Description of the Prior Art

In recent years, applications of liquid crystal display devices to word processors, lap-top personal computers, pocket-size TV displays, and the like have been in rapid progress. Especially, a reflective liquid crystal display device in which incident light is reflected to effect a display eliminates the necessity of any backlight, thereby lowering power consumption as well as reducing the size and the weight of the device.

The conventional liquid crystal display devices mostly employ a twisted nematic (TN) mode or a super-twisted nematic (STN) mode. In such display devices, about a half of the natural light introduced therein is absorbed, not being reflected to the outside by a linear polarizer disposed therein, resulting in a dark display. To overcome this trouble, other display modes have been proposed in an attempt to utilize all of the natural light. One example of these is a phase-change guest-host mode (D.L. White and G.N. Taylor, J. Appl. Phys. 45, p. 4718, 1974), which uses a cholesteric-nematic phase transition effect caused by the electric field. A reflective multicolor display using this display mode in combination with microcolor filters has also been proposed (T. Koizumi and T. Uchida, Proceedings of the SID, vol. 29, p. 157, 1988).

In the liquid crystal display device using the above display mode which does not need the polarizer, a brighter display can be obtained if the intensity of the light scattered in the direction vertical to the display screen is increased for all incident light from every direction. For this purpose, the shape of the filmed surface of a reflector for the display device should be controlled so that optimal reflective properties can be obtained. The aforementioned paper by T. Koizumi, et al. discloses a reflector which is fabricated by roughening the surface of a glass substrate with an abrasive, etching the surface with hydrofluoric acid for different periods of time thus controlling the roughness thereof and depositing a silver film on the roughened surface, so as to provide a bright reflective liquid crystal display.

However, the roughened surface of the above reflector which is formed by scratching the glass substrate with the abrasive is neither uniform in shape nor reproducible. Therefore, in the above disclosed method, it is not possible to obtain a controlled uniform reproducible surface roughness on the reflector, and thus to achieve a reflective liquid crystal display device with optimal reflective properties.

The objective of the present invention is to provide a reflective liquid crystal display device which comprises a reflector having an effective, reproducible reflective properties, and a method for fabricating such a display device.

SUMMARY OF THE INVENTION

The reflective liquid crystal display device of this invention, which overcomes the above-discussed and numerous other disadvantages and deficiencies of the prior art, comprises an insulating substrate having a transparent electrode formed thereon, a reflector including a core substrate, a number of small convex portions formed on the core substrate by patterning a photosensitive resin applied to one surface of the core substrate by use of a photomask having a predetermined pattern, and a reflective film covering the surface of the core substrate having the convex portions, and a liquid crystal layer sandwiched between the insulating substrate and the reflector.

In a preferred embodiment, the surface of the reflector on which the reflective film is formed faces the liquid crystal layer.

In a preferred embodiment, the reflective film of the reflector functions as a counter electrode for the transparent electrode on the insulating substrate.

In a preferred embodiment, the convex portions are formed at a pitch of 100 $\mu$m or less and have a height of 10 $\mu$m or less.

According to another aspect of the present invention, a method for fabricating a reflective liquid crystal display device having a reflector which includes a core substrate, a number of small convex portions formed on the core substrate and a reflective film covering the surface of the core substrate having the convex portions is provided. The method comprises the steps of patterning a photosensitive resin applied to one surface of a core substrate for the reflector by use of a photomask so as to form a number of small convex portions on the core substrate, heat-treating the core substrate having the convex portions, and forming a reflective film on the surface of the core substrate having the convex portions.

Thus, in the reflective liquid crystal display device of the present invention, a photosensitive resin applied to one surface of the core substrate of the reflector is patterned so as to form a predetermined shape of the convex portions thereon. In this way, the shape, size, and pitch of the convex portions, and the like can be optimally determined, thereby enabling the control of the reflective properties of the reflector effectively and reproducibly so as to provide a bright screen image on the display device.

Further, the surface of the reflector coated with the reflective film faces the liquid crystal layer, reducing the distance between the reflecting film and the liquid crystal layer and thereby effecting a reduced parallax. Also, in this case, the reflective film can be used as a counter electrode for the transparent electrode on the insulating substrate.

BRIEF DESCRIPTION OF THE DRAWINGS

This invention may be better understood and its numerous objects and advantages will become apparent to those skilled in the art by reference to the accompanying drawings as follows:

FIGS. 5 to 10 are graphs showing the reflective properties of the reflectors having the shapes of convex portions shown in FIGS. 4a to 4f, respectively, wherein FIGS. 5a to 10a show the dependence on an incident angle and FIGS. 5b to 10b show the dependence on an angle with respect to the coordinate axes on the surface of the reflector;

DESCRIPTION OF THE PREFERRED EMBODIMENT

Figure 1:
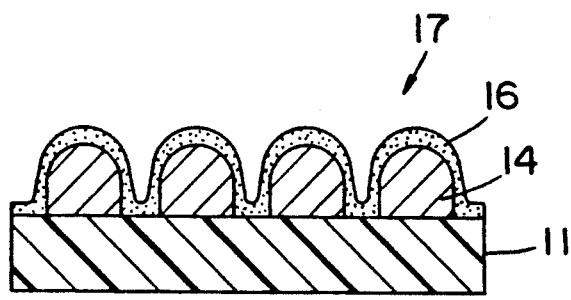
FIG. 1 is a sectional view of a reflector constituting a reflective liquid crystal display device according to the present invention.

FIG. 1 shows a reflector 17 to be used for a reflective liquid crystal display device of the present invention, and FIGS. 2a to 2d show the steps for fabricating the reflector 17. The procedure for fabricating the reflector 17 will be described as follows.

Figure 2A:
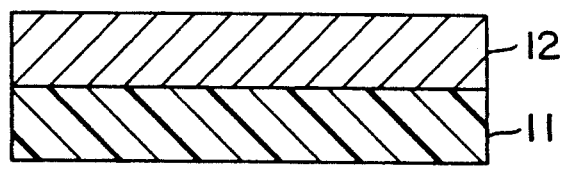
FIGS. 2a to 2d are sectional views showing the steps for fabricating the reflector of FIG. 1.
Figure 2B:
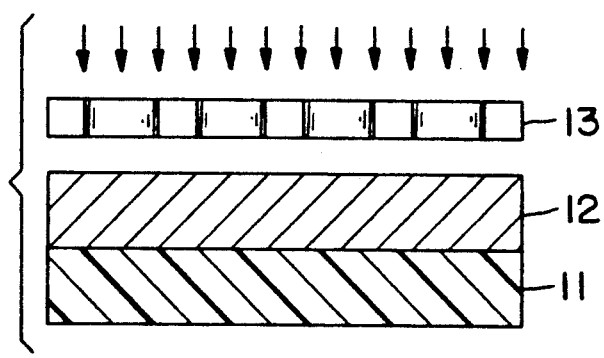
Figure 2C:
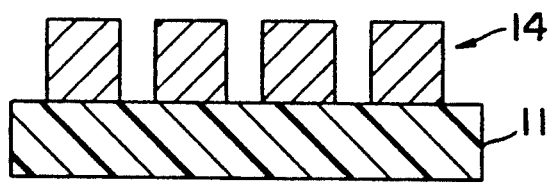

As shown in FIG. 2a, a resist film 12 made of a photosensitive resin is formed on one surface of a glass core substrate 11 preferably by spinning at a speed of 500 to 3000 r.p.m. In this example, a glass plate (No. 7059 manufactured by Corning) having a thickness of 1.1 mm was used for the core substrate 11, and the glass plate was coated with a photosensitive resin (OFPR-800 manufactured by Tokyo Ohka Kogyo Co., Ltd.) at a spinning speed of 1000 r.p.m. for 30 seconds so as to obtain the resist film 12 having a thickness of 4 $\mu$m. Then, the core substrate 11 coated with the resist film 12 was prebaked at 90° C. for 30 minutes. Next, as shown in FIG. 2b, a photomask 13 having a predetermined pattern was disposed over the resist film 12 and light was radiated through the photomask 13 to the resist film 12, which was then treated with a developer (for example, a 2.38% solution of NMD-3 manufactured by Tokyo Ohka Kogyo Co., Ltd.) so as to form a number of fine convex portions 14 on the surface of the core substrate 11, as shown in FIG. 2c.

Figure 2D:
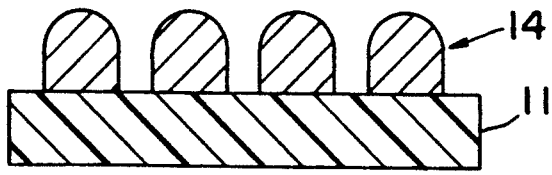

The section of the thus formed convex portions 14 is a square having substantially right angles. However, in order to cover the convex portions 14 with a reflective film 16 of a uniform thickness in a later stage, it is preferable to round the square convex portions 14. The inventors have found that the convex portions 14 can be easily rounded by heat treatment preferably at a temperature in the range of 120° to 250° C., more preferably at 200° C. In this example, the heat treatment was performed at 200° C. for 30 minutes so as to obtain the round convex portions 14 as shown in FIG. 2d.

Then, the surface of the core substrate 11 with the convex portions formed thereon was covered with a reflective film 16 having a uniform thickness as shown in FIG. 1. The material for the reflective film 16 can be Al, Ni, Cr, Ag, or other metal, and the thickness thereof is preferably 0.01 to 1.0 $\mu$m. In this example, the reflective film 16 was formed by the vacuum evaporation of Ag. In this way, the reflector 17 was formed.

Figure 4A:
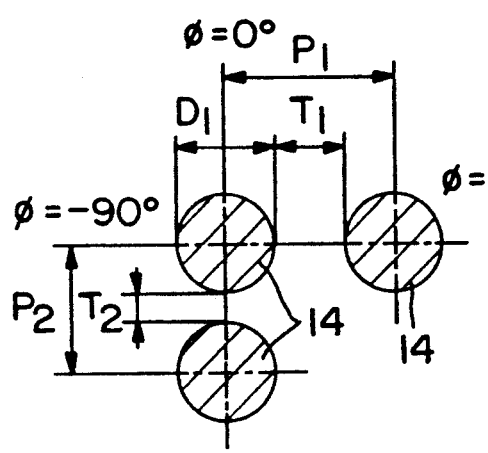
FIGS. 4a to 4f are plan views of convex portions for the reflector of FIG. 1.
Figure 4D:
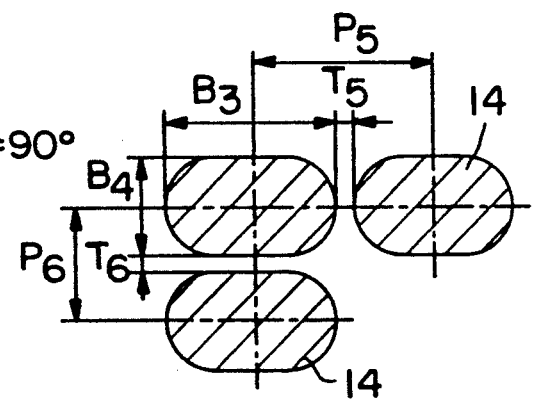
Figure 4B:
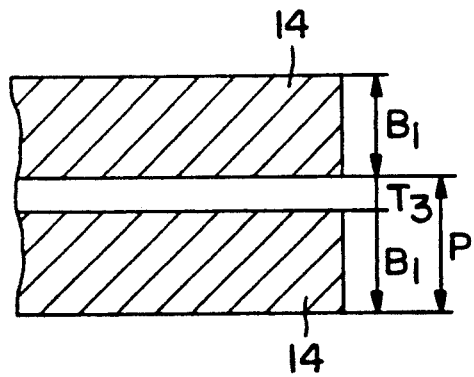
Figure 4E:
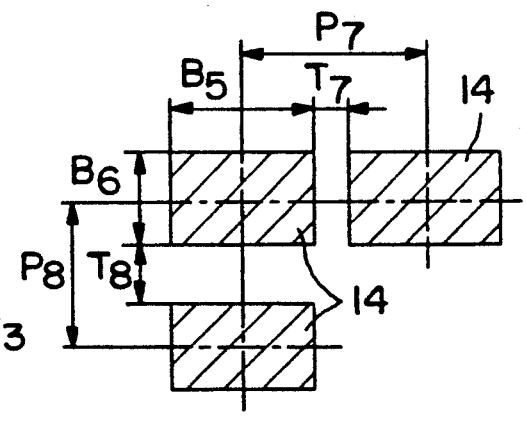
Figure 4C:
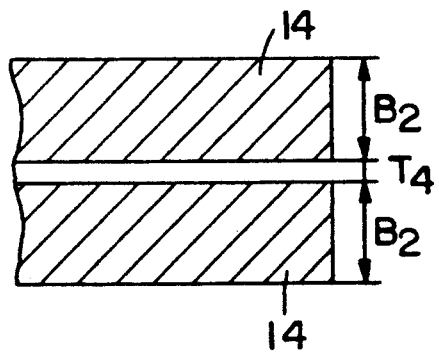
Figure 4F:
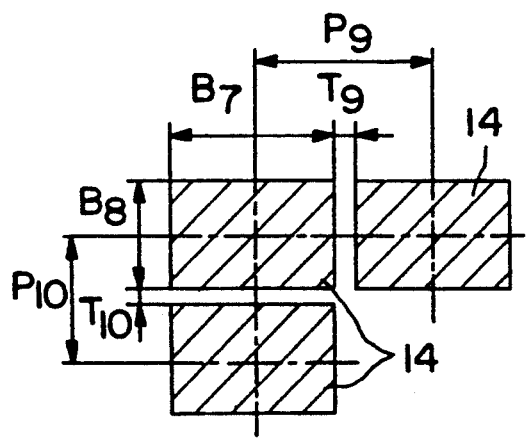
Figure 7A:
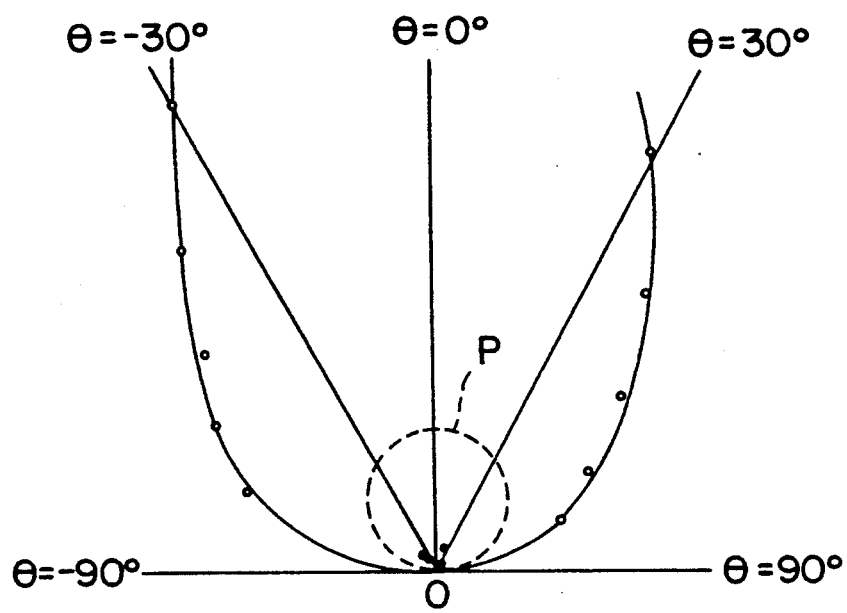
Figure 7B:
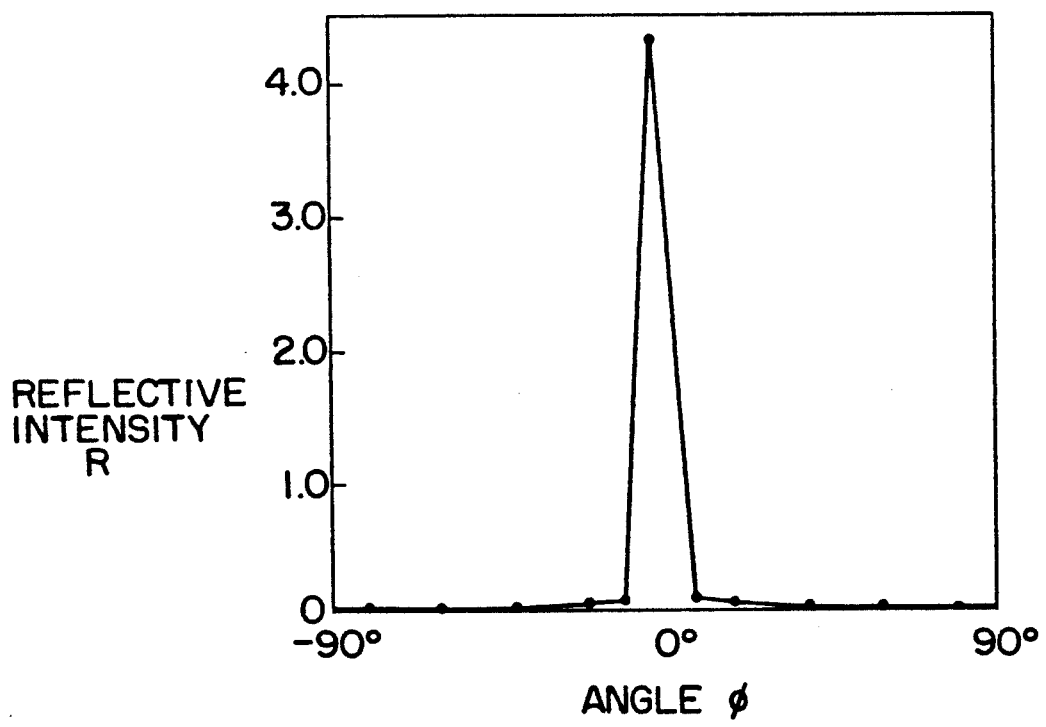
Figure 8A:
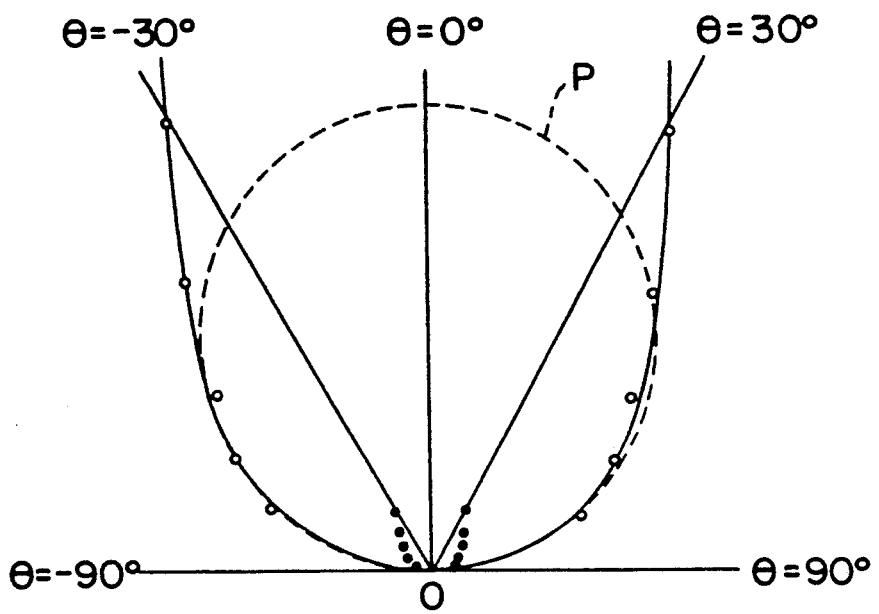
Figure 8B:
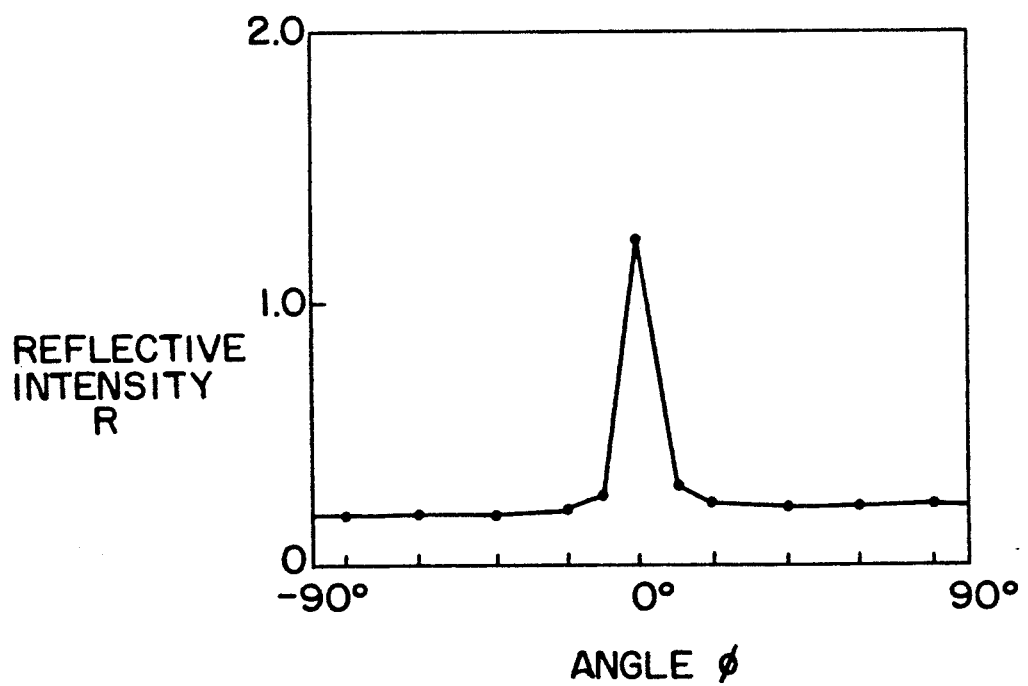

The shape of the convex portions 14 of the reflector 17 obtained after the heat treatment is round as viewed from the top, as shown in FIG. 4a. Other shapes such as an ellipse, a square, a rectangle, and a stripe as shown in FIGS. 4b to 4f are also possible. A diameter $D_1$ of the round convex portions 14 shown in FIG. 4a is for example 33 $\mu$m, and a lateral gap $T_1$ and a longitudinal gap $T_2$ between the adjacent convex portions 14 are 20 $\mu$m and 5 $\mu$m, respectively. Lateral and longitudinal distances between the centers of the adjacent convex portions 14 or pitches $P_1$ and $P_2$ are 53 $\mu$m and 38 $\mu$m, respectively. In FIG. 4b, the stripe convex portions 14 of one example having a width $B_1$ of 28 $\mu$m are formed with a gap $T_3$ of 10 $\mu$m and a pitch $P_3$ of 38 $\mu$m. In FIG. 4c, the stripe convex portions 14 of another example having a width $B_2$ of 33 $\mu$m are formed with a gap $T_4$ of 5 $\mu$m and a pitch $P_4$ of 38 $\mu$m. In FIG. 4d, the elliptic convex portions 14 having a length $B_3$ of 48 $\mu$m and a width $B_4$ of 33 $\mu$m are formed with gaps $T_5$ and $T_6$ of 5 $\mu$m, a lateral pitch $P_5$ of 53 $\mu$m and a longitudinal pitch $P_6$ of 38 $\mu$m. In FIG. 4e, the rectangular convex portions 14 of one example having a length $B_5$ of 43 $\mu$m and a width $B_6$ of 28 $\mu$m are formed with a lateral gap $T_7$ of 10 $\mu$m, a longitudinal gap $T_8$ of 20 $\mu$m, a lateral pitch $P_7$ of 53 $\mu$m and a longitudinal pitch $P_8$ of 48 $\mu$m. In FIG. 4f, the rectangular convex portions 14 of another example having a length $B_7$ of 48 $\mu$m and a width $B_8$ of 33 $\mu$m are formed with gaps $T_9$ and $T_{10}$ of 5 $\mu$m, a lateral pitch $P_9$ of 53 $\mu$m and a longitudinal pitch $P_{10}$ of 38 $\mu$m.

Figure 3:
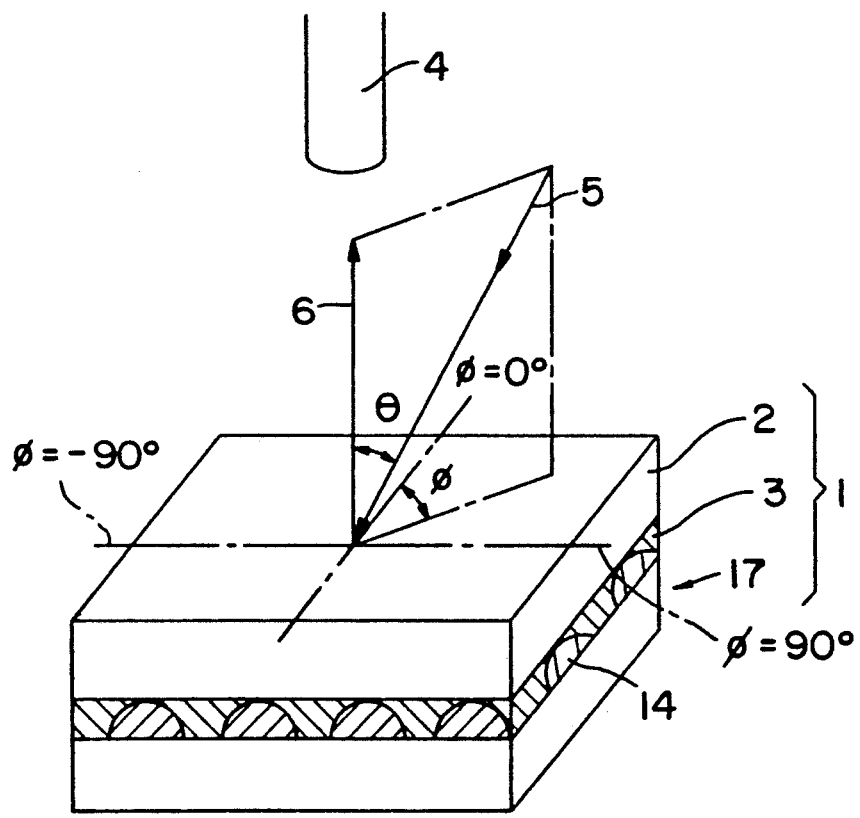
FIG. 3 is a perspective view showing the measurement of the reflective properties of the reflector of FIG. 1.

FIG. 3 shows a method for measuring the reflective properties of the reflector fabricated as described above. A model 1 for measuring the reflectance is formed to imitate the state of the reflector 17 being in contact with a liquid crystal layer when the reflector 17 is disposed in an actual liquid crystal display device. In the model 1, over the reflector 17 is placed a dummy glass substrate 2 having a refractive index of 1.5 which is substantially equal to that of an actual liquid crystal layer, and the reflector 17 and the dummy substrate 2 are sealed to each other with an ultraviolet-hardened adhesive 3.

An incident ray 5 is introduced into the dummy substrate 2 at an incident angle $\theta$ with respect to the normal of the model 1 and at an angle $\phi$ with respect to the coordinate axes on the model 1 (wherein when $\phi=0°$ the angle $\phi$ corresponds to the Y axis of an XY rectangular coordinate, and when $\phi=+90°$ or $-90°$ the angle $\phi$ corresponds to the X axis thereof). A photomultimeter 4 is disposed above the model 1 in the direction of the normal of the reflector 17 passing a point on the reflective film 16 irradiated with the incident ray 5. Under these conditions, a scattering ray 6 reflected by the reflector 17 is detected with the photomultimeter 4. The incident angle $\theta$ and the angle $\phi$ of the incident ray 5 are varied to measure the corresponding scattering ray 6, thereby determining the reflective properties of the reflector 17. It has been confirmed that the model 1 has the same reflective properties as the actual liquid crystal display device.

The reflective properties of the reflectors 17 corresponding to the shapes of the convex portions 14 thereof shown in FIGS. 4a to 4f are shown in FIGS. 5a and 5b to 10a and 10b, respectively. In FIGS. 5a to 10a, the reflective intensity of the light introduced at the incident angle $\theta$ is expressed as the distance from the origin O in the direction of the incident angle $\theta$. Each white dot denotes a result obtained when $\phi=0°$, and each black dot denotes a result obtained when $\phi=90°$. The chain-line curve P shows the reflective property measured for a standard white plate (magnesium oxide). In FIGS. 5b to 10b, the reflective intensity R of the light introduced at an incident angle $\theta$ of 30° is shown as a function of the angle $\phi$ with respect to the coordinate axes on the surface of the reflector.

As is apparent from these figures, the reflective intensity R of the reflector 17 is high when the sides of the convex portion 14 of the reflector 17 are linear, and it is especially high when the light is introduced into the convex portion 14 at the right angle to the linear sizes thereof. On the other hand, when the sides of the convex portion 14 are curved, the dependence on the angle $\theta$ is reduced. It is advantageous to make best use of these different reflective properties of light and to vary the shape of the convex portions 14 of the reflector 17, the ratio of the length to the width of the convex portions 14, and the pitch of the adjacent convex portions 14, so as to control the reflective intensity R of the reflector 17 arbitrarily and reproducibly. Thus, in a reflective liquid crystal display device comprising the reflector 17 with which the reflective intensity R can be controlled, rays reflected at a desired angle can be effectively obtained.

Further, it has been confirmed that the inclined angle of the sides of the convex portion 14 can be freely determined by suitably selecting the material and the thickness of the photosensitive resin for the resist film 12 and the temperature for the heat treatment, and in turn, by varying the inclined angle of the sides of the convex portion 14, the dependence of the reflective intensity R on the incident angle $\theta$ can be controlled. It has also been confirmed that the rate of the regular reflective elements in the reflected rays can be controlled by varying the percentage of the concave portions between the convex portions in the entire area of the reflector.

Figure 11:
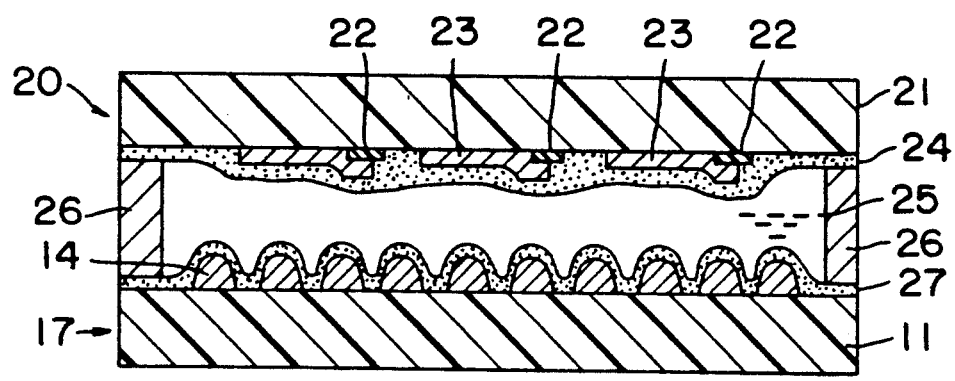
FIG. 11 is a sectional view of a reflective liquid crystal display panel according to the present invention employing the reflector of FIG. 1.

A reflective liquid crystal display panel fabricated using the above-described reflector 17 is shown in FIG. 11, in which the reflector 17 and an active matrix substrate 20 are disposed facing each other with a predetermined space therebetween. The thus formed space is surrounded by a seal 26 to define a liquid crystal layer 25 inside. The active matrix substrate 20 has a structure of thin film transistors (TFTs) 22 formed on an insulating substrate 21 made of glass for example and pixel electrodes 23 connected to the TFTs 22. Further, an aligning layer 24 is formed on the entire surface of the glass substrate 21 so as to cover the TFTs 22 and the pixel electrodes 23. The reflective film 16 (not shown in FIG. 11) of the reflector 17 is also covered with an aligning layer 27. The reflective film 16 has another function as a counter electrode opposing the pixel electrode 23 on the active matrix substrate 20 via the liquid crystal layer 25.

In this example, the seal 26 was formed by printing an adhesive sealing agent containing 7 $\mu$m-size spacers around the entire edges of the reflector 17 and the active matrix substrate 20 by a screen printing method. The space surrounded by the seal 26 is filled with the liquid crystal by vacuum deaeration, so as to form the liquid crystal layer 25. In this example, a guest-host liquid crystal with a black-dye mixture (ZLI2327 manufactured by Merk) containing an optically active substance (S811 manufactured by Merk) by 4.5% was used for the liquid crystal layer 25.

Figure 12A:
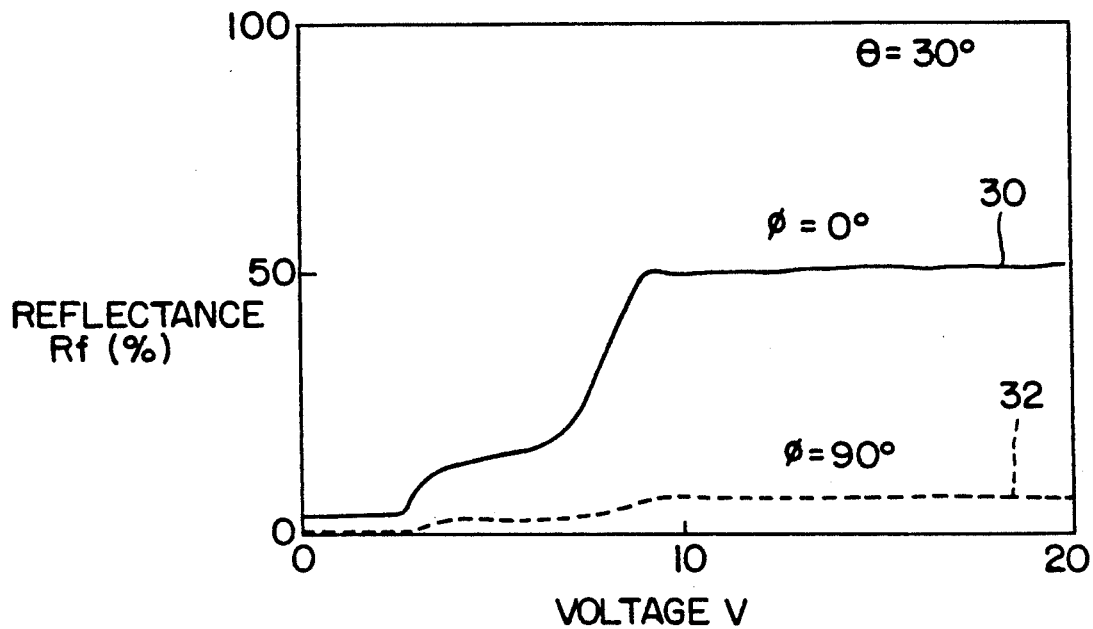
FIGS. 12a and 12b are graphs showing the applied voltage-reflectance properties.
Figure 12B:
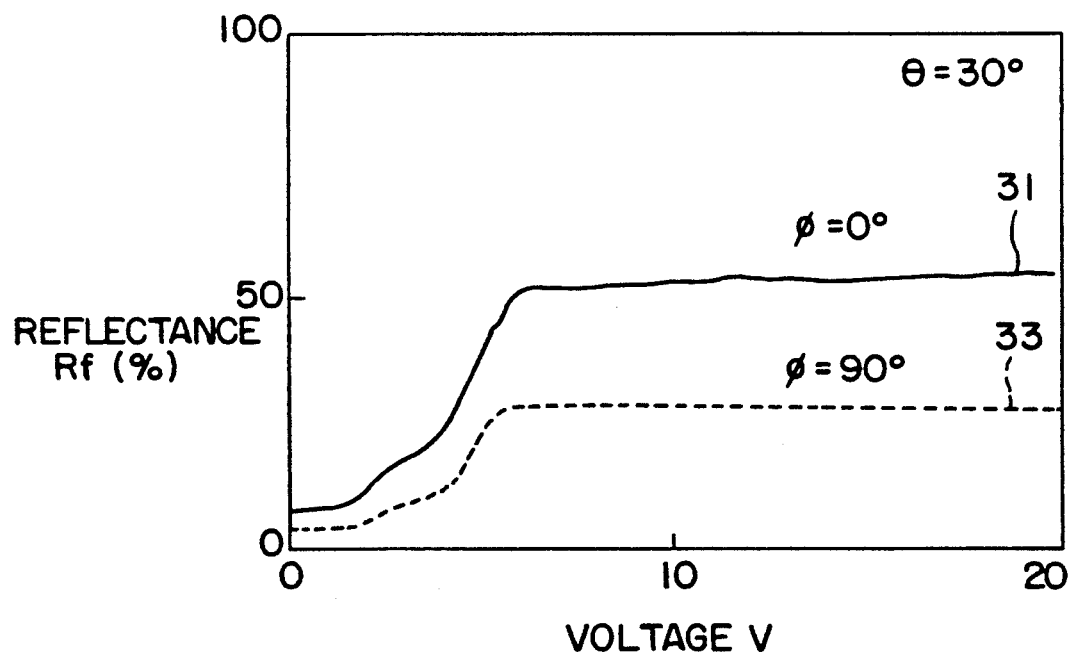
Figure 4B:
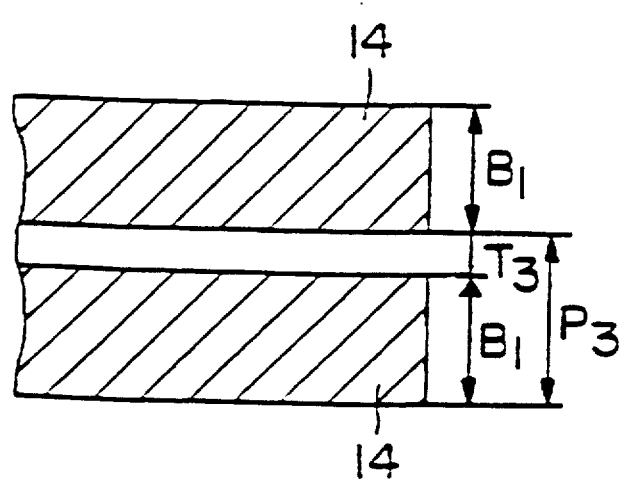

FIGS. 12a and 12b show the relationship between the voltage V and the reflectance Rf of the thus formed reflective liquid crystal display panel in the case of having the convex portions 14 shown in FIGS. 4d and 4f, respectively. The reflectance Rf was measured under the same conditions as shown in FIG. 3, where the reflective liquid crystal display panel was placed at the position of the model 1. The voltage V represents a voltage applied between the pixel electrodes 23 and the reflective film 16, and the reflectance Rf represents a reflectance of an incident ray introduced at an incident angle $\theta$ of 30°. The reflectance Rf is obtained by calculating a ratio of the intensity of a scattering ray from the reflective liquid crystal display panel as the object for measuring in the direction of the normal thereof to that of a scattering ray from a standard white plate in the direction of the normal thereof. In FIGS. 12a and 12b, the solid-line curves 30 and 31 show the respective properties when the angle $\phi=0°$, and the dashed-line curves 32 and 33 show the respective properties when the angle $\phi=90°$. The reflectances of the former are higher than those of the latter, respectively, reaching as high as 50%. The contrast ratio of the display device of this example was 15 to 20. Thus, it has been proved that the reflective liquid crystal display device of this example provides a very bright screen.

In this example, the convex portions 14 of the reflector 17 having longitudinal and lateral pitches of 38 to 53 $\mu$m and a height of 4 $\mu$m were used. However, it has been confirmed that the reflective properties of the liquid crystal display device can be controlled in the same manner as described above with the reflector 17 having convex portions 14 with pitches of 100 $\mu$m or less and a height of 10 $\mu$m or less. Further, when the reflector 17 covered with the reflective film 16 (not shown) is disposed facing the liquid crystal layer 25 as shown in FIG. 11, it is preferable to set the height of the convex portions 14 of the reflector 17 lower than the thickness of the liquid crystal layer 25 and to make the inclined sides of the convex portions 14 gentle so as not to disturb the orientation of the liquid crystal layer 25.

The material for the resist film 12 used for the reflector 17 is not limited to the product OPFR800, but any photosensitive resins which can be patterned in a light-exposure process positively or negatively can be used for this purpose. Such resins include, for example, OMR-83, OMR-85, ONNR-20, OFPR-2, OFPR-830, OFPR-5000 manufactured by Tokyo Ohka Kogyo Co., Ltd., TF-20, 1300-27, 1400-27 manufactured by Shipley, Photoneys manufactured by Toray, RW101 manufactured by Sekisui Fine Chemical Co., and R101 and R633 manufactured by Nippon Kayaku Co.

A transparent glass substrate was used for the core substrate 11 of the reflector 17, but a non-transparent substrate such as a Si substrate can be used to achieve the same effect. The non-transparent substrate has an advantage of being able to integrate circuits on the substrate.

In the liquid crystal display panel of this example, the reflective film 16 of the reflector 17 faces the liquid crystal layer 25, reducing the distance between the reflective film 16 and the liquid crystal layer 25 and thereby reducing the parallax so as to give a quality display image. Further, the reflective film 16 functions as a counter electrode for the pixel electrodes 23 of the active matrix substrate 20, thereby realizing the simple structure of the liquid crystal display panel and the easy manufacture thereof.

Figure 13:
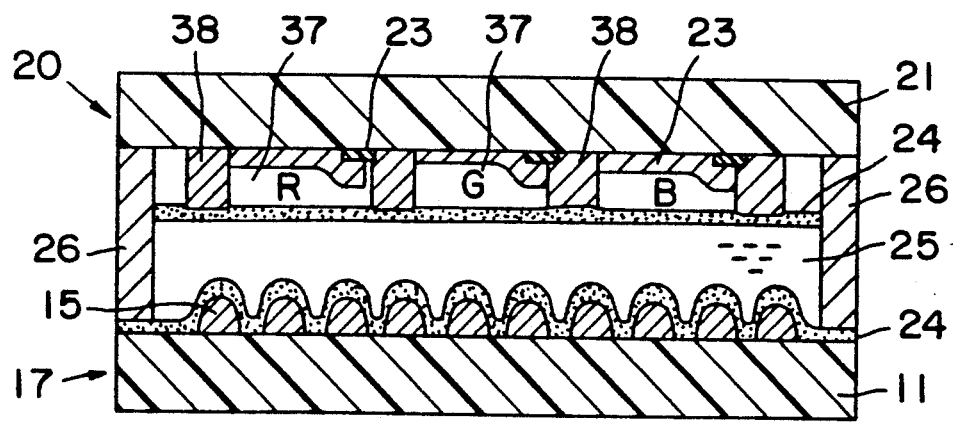
FIG. 13 is a sectional view showing an application of the present invention to a color liquid crystal display device.

Moreover, as shown in FIG. 13, a color filter 37 can be disposed corresponding to each pixel electrode 23 of the active matrix substrate 20 and a black mask 38 between the adjacent color filters 37, so as to realize a reflective color liquid crystal display panel. An effective color display can be obtained by using the above structure of this example, that is, disposing the reflector 17 opposed to the active matrix substrate 20 having the aligning layer 24. Alternatively, it is possible to use the reflective film formed on the convex portions as the pixel electrodes. In this case, the reflective film should be formed in a matrix and electrically connected to the TFTs 22.

It is also possible to employ display modes other than the above-mentioned phase-change guest-host mode, such as a light absorption mode like a two-layer guest-host mode, a light scattering mode like a polymer dispersing LCD, or a birefringent display mode used for a ferroelectric LCD.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A reflective liquid crystal display device comprising:
    an insulating substrate having a transparent electrode formed thereon;
    a reflector including a core substrate, a number of small convex portions formed on the core substrate by patterning a photosensitive resin applied to one surface of the core substrate by use of a photomask having a predetermined pattern, and a reflective film covering the surface of the core substrate having the convex portions; and
    a liquid crystal layer sandwiched between the insulating substrate and the reflector.

2. A reflective liquid crystal display device according to claim 1, wherein the surface of the reflector on which the reflective film is formed faces the liquid crystal layer.

3. A reflective liquid crystal display device according to claim 2, wherein the reflective film of the reflector functions as a counter electrode for the transparent electrode on the insulating substrate.

4. A reflective liquid crystal display device according to claim 1, wherein the convex portions are formed at a pitch of 100 $\mu$m or less and have a height of 10 $\mu$m or less.

5. A reflective liquid crystal display device according to claim 2, wherein the convex portions are formed at a pitch of 100 $\mu$m or less and have a height of 10 $\mu$m or less.

6. A reflective liquid crystal display device according to claim 3, wherein the convex portions are formed at a pitch of 100 $\mu$m or less and have a height of 10 $\mu$m or less.

7. A method for fabricating a reflective liquid crystal display device provided with a reflector including a core substrate, a number of small convex portions formed on the core substrate and a reflective film covering the surface of the core substrate having the convex portions, the method comprising the steps of:
    patterning a photosensitive resin applied to one surface of a core substrate for the reflector by use of a photomask so as to form a number of small convex portions on the core substrate;
    heat-treating the core substrate having the convex portions; and
    forming a reflective film on the surface of the core substrate having the convex portions.

* * * * *

UNITED STATES PATENT AND TRADEMARK OFFICE
CERTIFICATE OF CORRECTION

PATENT NO. : 5,204,765
DATED : April 20, 1993
INVENTOR(S) : Seiichi Mitsui, et al.

It is certified that error appears in the above-indentified patent and that said Letters Patent is hereby corrected as shown below:

The sheet of drawing consisting of figure 4b, should be deleted to appear as per attached sheet.

Signed and Sealed this

Twenty-sixth Day of April, 1994

Attest:

BRUCE LEHMAN

Attesting Officer    Commissioner of Patents and Trademarks